United States Patent
Zeng

(10) Patent No.: US 12,355,071 B2
(45) Date of Patent: Jul. 8, 2025

(54) POSITIVE ELECTRODE ACTIVE MATERIAL, ELECTROCHEMICAL APPARATUS, AND ELECTRONIC DEVICE

(71) Applicant: CONTEMPORARY AMPEREX TECHNOLOGY (HONG KONG) LIMITED, Hong Kong (CN)

(72) Inventor: Yuqun Zeng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 237 days.

(21) Appl. No.: 18/322,824

(22) Filed: May 24, 2023

(65) Prior Publication Data

US 2023/0299275 A1 Sep. 21, 2023

Related U.S. Application Data

(63) Continuation of application No. PCT/CN2022/079167, filed on Mar. 4, 2022.

(30) Foreign Application Priority Data

Jun. 26, 2021 (CN) .......................... 202110742609.6

(51) Int. Cl.
*H01M 4/36* (2006.01)
*C01B 25/45* (2006.01)
*H01M 4/131* (2010.01)
*H01M 4/48* (2010.01)
*H01M 4/58* (2010.01)
*H01M 4/62* (2006.01)
(Continued)

(52) U.S. Cl.
CPC ............ *H01M 4/366* (2013.01); *C01B 25/45* (2013.01); *H01M 4/131* (2013.01); *H01M 4/48* (2013.01); *H01M 4/5825* (2013.01); *H01M 4/625* (2013.01); *H01M 10/054* (2013.01); *H01M 2004/028* (2013.01)

(58) Field of Classification Search
None
See application file for complete search history.

(56) References Cited

U.S. PATENT DOCUMENTS

2003/0054255 A1 3/2003 Hidaka et al.

FOREIGN PATENT DOCUMENTS

| CA | 2955839 A1 | 3/2016 |
|---|---|---|
| CN | 102320758 A | 1/2012 |

(Continued)

OTHER PUBLICATIONS

The European Patent Office (EPO) The Partial Supplementary European Search Report for Application No. 22827034.4 Oct. 22, 2024 16 Pages.

(Continued)

*Primary Examiner* — Carlos Barcena
(74) *Attorney, Agent, or Firm* — ANOVA LAW GROUP, PLLC

(57) ABSTRACT

A positive electrode active material includes a conductive base material and an active substance distributed at the conductive base material. The active substance has a core-shell structure including a core layer material and a shell layer material. The conductive base material includes a carbon material, the core layer material includes a phosphate-based sodium salt material, and the shell layer material includes a metal oxide.

10 Claims, 1 Drawing Sheet

(51) Int. Cl.
*H01M 10/054* (2010.01)
*H01M 4/02* (2006.01)

(56) References Cited

FOREIGN PATENT DOCUMENTS

| | | |
|---|---|---|
| CN | 106058251 A | 10/2016 |
| CN | 107017394 A | 8/2017 |
| CN | 107017395 A | 8/2017 |
| CN | 107492630 A | 12/2017 |
| CN | 108736010 A | 11/2018 |
| CN | 109065855 A | 12/2018 |
| CN | 109616651 A | 4/2019 |
| CN | 111525112 A | 8/2020 |
| CN | 112510198 A | 3/2021 |
| CN | 112786846 A | 5/2021 |
| CN | 113437275 A | 9/2021 |
| CN | 113437276 A | 9/2021 |
| CN | 114068866 A | 2/2022 |
| CN | 113437275 B | 3/2022 |
| JP | 2015018621 A | 1/2015 |
| JP | 2018006156 A | 1/2018 |
| KR | 1020160136809 A | 11/2016 |
| KR | 1020200109991 A | 9/2020 |
| KR | 20200138198 A | 12/2020 |
| WO | 2016159878 A1 | 10/2016 |
| WO | 2017195332 A1 | 11/2017 |
| WO | 2019145181 A1 | 8/2019 |
| WO | 2020174487 A1 | 9/2020 |

OTHER PUBLICATIONS

The Japan Patent Office (JPO) Notice of Reasons for Refusal for Application No. 2023-525942 Jun. 18, 2024 12 Pages (including translation).
China National Intellectual Property Administration (CNIPA) Office Action 1 for Application No. 202210211674.0 Jun. 6, 2023 14 Pages (including translation).
The World Intellectual Property Organization (WIPO) International Search Report for PCT/CN2022/079167 May 18, 2022 6 pages (including English translation).
The China National Intellectual Property Administration (CNIPA) Notification to Grant Patent Right for Invention for Chinese Application 202110742609.6 Jan. 25, 2022 6 Pages (With Translation).
The China National Intellectual Property Administration (CNIPA) The First Office Action for Chinese Application 202110742609.6 Oct. 29, 2021 21 Pages (With Translation).
The China National Intellectual Property Administration (CNIPA) The Second Office Action for Chinese Application 202110742609.6 Dec. 24, 2021 12 Pages (With Translation).
Peng Du et al., "Improving the Electrochemical Performance of $Na_3V_2O_2(PO_4)_2F$ Cathode by Using a Defect-containing $TiO_{2-x}$ Coating for Sodium ion Batteries", Journal od Alloys and Compounds, Sep. 13, 2019, pp. 1-10.
Lei Dong et al., "Improved high-rate performance of $Na_3V_2(PO_4)_3$ with an atomic layer deposition-generated $Al_2O_3$ layer as a cathode material for sodium-ion batteries", Materials Letters, Jun. 15, 2017, pp. 75-78.
Jie Yang et al., "A High-Rate and Ultralong-Life Sodium-Ion Battery Based on $NaTi_2(PO_4)_3$ Nanocubes with Synergistic Coating of Carbon and Rutile $TiO_2$", Small Journal, Nov. 2015, pp. 3744-3749.

POSITIVE ELECTRODE ACTIVE MATERIAL, ELECTROCHEMICAL APPARATUS, AND ELECTRONIC DEVICE

CROSS-REFERENCE TO RELATED APPLICATIONS

The present application is a continuation of International Application No. PCT/CN2022/079167, filed on Mar. 4, 2022, which claims priority to Chinese patent application No. 202110742609.6, filed on Jun. 26, 2021 and entitled "POSITIVE ELECTRODE ACTIVE MATERIAL, ELECTROCHEMICAL APPARATUS, AND ELECTRONIC DEVICE", the entire contents of which are incorporated herein by reference.

TECHNICAL FIELD

The present application relates to the field of secondary batteries, and in particular to a positive electrode active material, an electrochemical apparatus, and an electronic device.

BACKGROUND

As energy and environmental issues become more prominent, the new energy industry has received more attention. Lithium-ion batteries have been widely used as an important new energy storage device in recent years due to their advantages such as high energy density and good cycling performance. However, the cost of lithium-ion batteries has remained high due to the scarcity of active substance resources related to lithium-ion batteries, and moreover, there are serious problems such as the depletion of relevant resources, so there is a need to develop other low-cost metal-ion secondary battery systems.

Sodium-ion batteries have become a popular research direction in recent years due to their advantages such as low cost, abundant sodium metal resources, and similar preparation processes to lithium-ion batteries. In a sodium-ion secondary battery system, a pyrophosphate-based positive electrode material has been widely concerned due to its good cycling performance and low cost. However, due to poor conductivity of the pyrophosphate-based positive electrode material itself, the direct use of the material will affect gram capacity performance and lead to poor electrochemical performance, which seriously hinders its large-scale application.

SUMMARY

The present application provides a positive electrode active material, an electrochemical apparatus, and an electronic device, in which the conductivity of the positive electrode active material can be effectively improved, the gram capacity and kinetic performances of the material are improved, side reactions are reduced, and cycling performance of the positive electrode active material is enhanced.

In a first aspect, the present application provides a positive electrode active material; the positive electrode active material comprises a conductive base material and an active substance distributed at the conductive base material, the active substance having a core-shell structure, and the core-shell structure including a core layer material and a shell layer material, where the core layer material comprises a phosphate-based sodium salt material, the shell layer material comprises a metal oxide, and the conductive base material comprises a carbon material.

According to an embodiment in the first aspect of the present application, the metal oxide comprises at least one of $WO_3$, $Al_2O_3$, $ZnO$, $CuO$, or $TiO_2$.

According to an embodiment in the first aspect of the present application, the positive electrode active material has at least one of the following features:
(1) the chemical formula of the phosphate-based sodium salt material is $Na_{x1}R_{y1}(PO_4)_{Z1}$, where $1 \le x_1 \le 3$, $1 \le y_1 \le 2$, and $1 \le z_1 \le 3$, and R comprises least one of Mg, Al, Sc, Ti, V, Cr, Mn, Fe, Co, Ni, Cu, Zn, Zr, Nb, Mo, Sn, Hf, Ta, W and Pb;
(2) the chemical formula of the phosphate-based sodium salt material is $Na_{x2}R_{y2}(P_2O_7)_{Z2}$, where $1 \le x_2 \le 7$, $1 \le y_2 \le 3$, and $1 \le z_2 \le 4$, and R comprises at least one of Mg, Al, Sc, Ti, V, Cr, Mn, Fe, Co, Ni, Cu, Zn, Zr, Nb, Mo, Sn, Hf, Ta, W or Pb;
(3) the chemical formula of the phosphate-based sodium salt material is $Na_{x3}R_{y3}(Pa)_{Z3}(P_2O_7)_{k3}$, where $1 \le x_3 \le 7$, $1 \le y_3 \le 4$, $1 \le z_3 \le 2$, and $1 \le k_3 \le 4$, and R comprises at least one of Mg, Al, Sc, Ti, V, Cr, Mn, Fe, Co, Ni, Cu, Zn, Zr, Nb, Mo, Sn, Hf, Ta, W or Pb; and
(4) the chemical formula of the phosphate-based sodium salt material is $Na_{x4}R_{y4}(PO_4)_{Z4}M_{l1}$, where $1 \le x_4 \le 3$, $1 \le y_4 \le 2$, $1 \le z_4 \le 2$, and $1 \le l_1 \le 3$, R comprises at least one of Mg, Al, Sc, Ti, V, Cr, Mn, Fe, Co, Ni, Cu, Zn, Zr, Nb, Mo, Sn, Hf, Ta, W or Pb, and M comprises at least one of F, Cl, or Br.

According to an embodiment in the first aspect of the present application, the phosphate-based sodium salt material comprises at least one of $NaFePO_4$, $Na_3V_2(PO_4)_3$, $Na_2FeP_2O_7$, $Na_2MnP_2O_7$, $NaCoP_2O_7$, $Na_7V_3(P_2O_7)_4$, $Na_2FePO_4F$, $Na_3V_2(PO_4)_2F_3$, $Na_4Fe_3(PO_4)_2(P_2O_7)$, $Na_4Mn_3(PO_4)_2(P_2O_7)$, $Na_4Co_3(PO_4)_2(P_2O_7)$, $Na_4Ni_3(PO_4)_2(P_2O_7)$, or $Na_7V_4PO_4)(P_2O_7)_4$.

According to an embodiment in the first aspect of the present application, actual mass of oxygen atoms in the metal oxide is 70% to 95% of theoretical mass of oxygen atoms in the metal oxide.

According to an embodiment in the first aspect of the present application, the positive electrode active material has at least one of the following features:
(5) a thickness of the shell layer material is 50 nm to 400 nm;
(6) a mass percentage of the shell layer material in the positive electrode active material is 1% to 10%;
(7) a mass percentage of the core layer material in the positive electrode active material is 90% to 99%; and
(8) a mass percentage of the conductive base material in the positive electrode active material is 1% to 10%.

According to an embodiment in the first aspect of the present application, the positive electrode active material has at least one of the following features:
(9) the carbon material comprises at least one of carbon nanotubes, graphene, carbon fiber, natural graphite, or artificial graphite;
(10) the carbon material comprises an oxygen-containing group including at least one selected from a carboxyl group, a hydroxyl group and an ether group;
(11) the carbon material comprises an oxygen-containing group, and a mass percentage of oxygen atoms in the carbon material is greater than or equal to 0.1%; and
(12) the conductive base material is a carbon material.

According to an embodiment in the first aspect of the present application, the positive electrode active material has at least one of the following features:

(13) a resistivity of the positive electrode active material under a pressure of 20 MPa is 0.005 Ω·cm to 100 Ω·cm;

(14) a median particle size of the positive electrode active material is 5 μm to 20 μm; and

(15) a gram capacity of the positive electrode active material is 100 mAh/g to 180 mAh/g.

In a second aspect, the present application provides an electrochemical apparatus, comprising a positive electrode sheet, a negative electrode sheet, a separator, and an electrolyte solution, the positive electrode sheet comprising the positive electrode active material described above.

In a third aspect, the present application provides an electronic device, the electronic device comprising the electrochemical apparatus described above.

The technical solutions of the present application have at least the following beneficial effects:

the present application provides a positive electrode active material, where a surface of the phosphate-based sodium salt material is cladded with a metal oxide that has a strong mechanical strength, so that stability of a cladding layer can still be maintained when volume of the material changes during charging and discharging; moreover, a large number of oxygen vacancies bring a certain degree of conductivity; in addition, the metal oxide can form a metal sodium salt having a high sodium-ion conductivity with shuttled sodium ions, thereby improving kinetic performance of the material. In summary, the cladding layer can, on the one hand, improve conductivity of the phosphate-based sodium salt material to improve gram capacity performance and kinetic performance, and on the other hand, prevent a direct contact between the phosphate-based sodium salt material and the electrolyte solution, thereby reducing side reactions and improving cycling performance of the positive electrode active material. By attaching the cladded active substance onto the conductive base material, conductivity of the material can be further improved with high conductivity of the conductive base material, so that the positive electrode active material with a conductive polymer cladding structure and the conductive base material can have higher gram capacity performance and better kinetic performance and cycling performance.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application.

REFERENCE SIGNS

Figure 1:
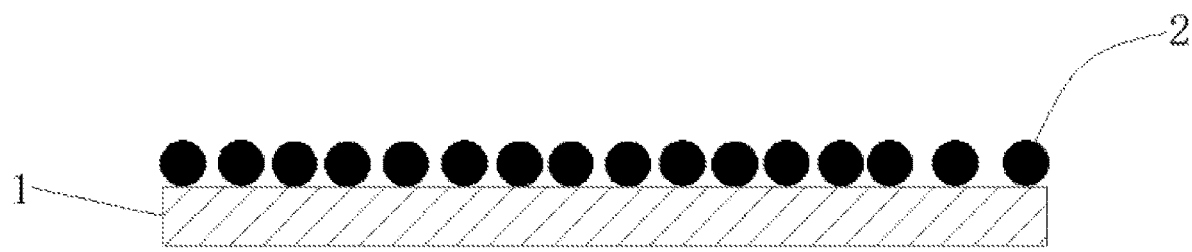
FIG. 1 is a schematic structural diagram of a positive electrode active material according to an embodiment of the present application.

1—conductive base material;
2—active substance; 21—core layer material; and 22—shell layer material.

DETAILED DESCRIPTION

To make the objectives, technical solutions, and advantages of the present application clearer, the following further describes the present application in detail with reference to the accompanying drawings and embodiments. It should be understood that specific examples described herein are intended only to explain the present application, but not to limit the present application.

In the description of the specification, unless otherwise expressly specified and limited, the terms "first" and "second" are only used for descriptive purposes, and cannot be understood as indicating or implying relative importance; unless otherwise specified or stated, the term "plurality" refers to two or more; the terms "connected", "fixed", and the like should be understood broadly, for example, "connected" may be fixedly connected, or may be detachably connected, or integrally connected, or electrically connected; it may be directly connected or indirectly connected through an intermediate medium.

For those of ordinary skill in the art, the specific meanings of the above terms in the present application can be understood according to specific situations.

In the description of the present specification, it is to be understood that the orientation words "upper", "lower" and the like in the description of the examples of the present application are described from the perspective shown in the drawings, and should not be understood as limiting the examples of the present application. In addition, in the context, it should also be understood that when an element is referred to as being "connected" "above" or "below" another element, it can be connected not only directly "above" or "below" the other element, but also indirectly "above" or "below" the other element through an intermediate element.

Figure 2:
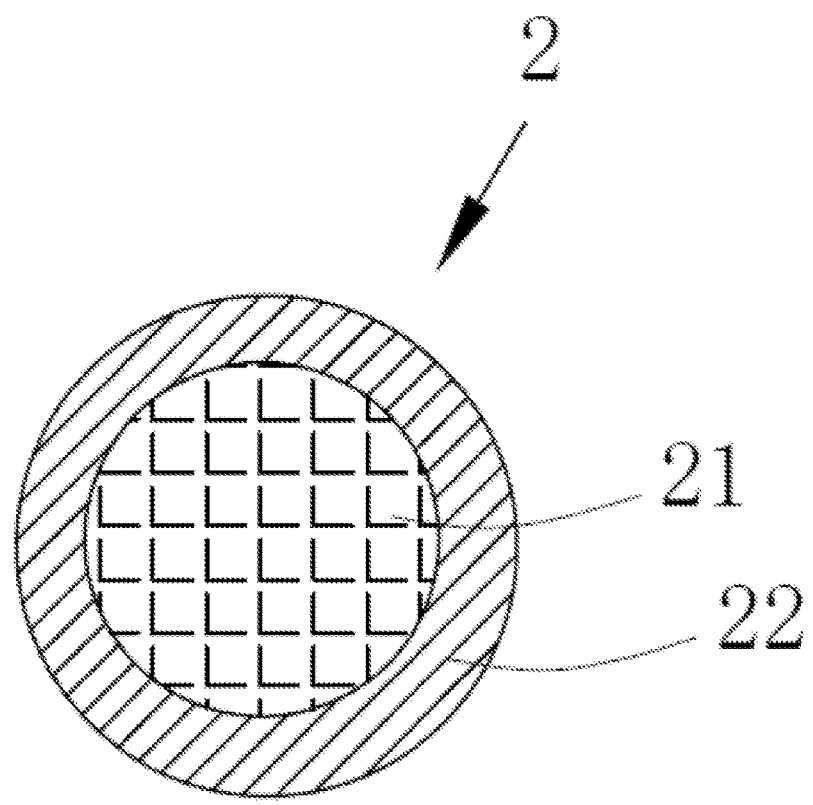
FIG. 2 is a schematic structural diagram of an active substance in a positive electrode active material according to an embodiment of the present application.

In a first aspect, the present application provides a positive electrode active material. FIG. 1 is a schematic structural diagram of a positive electrode active material according to an embodiment of the application. As shown in FIG. 1, the positive electrode active material comprises a conductive base material 1 and an active substance 2 distributed at the conductive base material 1. The active substance 2 has a core-shell structure. FIG. 2 is a schematic structural diagram of an active substance in a positive electrode active material according to an embodiment of the present application. As shown in FIG. 2, the core-shell structure includes a core layer material 21 and a shell layer material 22. The core layer material 21 comprises a phosphate-based sodium salt material, the shell layer material 22 comprises a metal oxide, and the conductive base material 1 comprises a carbon material.

In the present application, the conductive base material 1 is used to construct a conductive network, and the active substance 2 can be adhered to a surface of the conductive base material 1, or attached to a hole structure of the conductive base material 1, which is not limited here. By attaching the active substance 2 onto the conductive base material 1, conductivity of the positive electrode active material can be improved with high conductivity of the conductive base material.

In the foregoing solution, the conductive base material 1 is a carbon material. The carbon material comprises at least one of carbon nanotubes, graphene, carbon fiber, natural graphite, or artificial graphite. Specifically, the carbon material comprises an oxygen-containing group including at least one selected from a carboxyl group, a hydroxyl group and an ether group. A mass percentage of oxygen atoms in the oxygen-containing group is greater than or equal to 0.1%. Optionally, the mass percentage of oxygen atoms in the oxygen-containing group may specifically be 0.1%, 0.2%, 0.3%, 0.4%, 0.5%, 0.6%, 0.7%, 0.8%, 0.9%, 1%, or the like, which is not limited here. By controlling the mass percentage of oxygen atoms in the carbon material, an overpotential of the conductive base material can be reduced, poor affinity between the active substance and a positive electrode current collector can be overcome, and a bonding force between the active material and the positive electrode current collector can be improved.

In the actual application process, the mass percentage of the conductive base material 1 in the positive electrode active material is 1% to 10%. Optionally, the mass percentage of the conductive base material in the positive electrode active material may be 1%, 2%, 3%, 4%, 5%, 6%, 7%, 8%, 9%, 10%, or the like, which is not limited here. If the mass percentage of conductive base material 1 in the positive electrode active material is too high, it will result in excessive carbon material with high specific surface area, no capacity, and low compacted density and reduce battery capacity, thereby resulting in a decrease of the battery energy density and shortening of cycling life. If the mass percentage of the conductive base material 1 in the positive electrode active material is too low, it will result in a difficulty in forming an effective conductive network in the active substance 2, leading to a decrease of conductivity rate, degradation of conductivity and shortening of life of the battery. In some embodiments, the mass percentage of the conductive base material 1 in the positive electrode active material may be 4% to 8%.

In the foregoing solution, the active substance 2 on the conductive base material 1 has a core-shell structure, the core-shell structure includes a core layer material 21 and a shell layer material 22, the core layer material 21 is cladded with the shell layer material 22, and the cladding structure is a full cladding or a half cladding; a cladding method may refer to a solid-phase cladding method, a liquid-phase cladding method, a gas-phase cladding method, or the like; and the specific cladding method can be selected according to actual needs, which is not limited here. Specifically, the shell layer material 22 and the core layer material 21 of the active substance 2 are adsorbed by the Coulomb attraction of charges or tightly connected by a firm chemical bond between the core layer material 21 and the shell layer material 22.

Specifically, a composition of the core layer material 21 comprises a phosphate-based sodium salt material, and the chemical formula of the phosphate-based sodium salt material comprises at least one of $Na_{x1}R_{y1}(PO_4)_{Z1}$, $Na_{x2}R_{y2}(P_2O_7)_{Z2}$, $Na_{x3}R_{y3}(PO_4)_{Z3}(P_2O_7)_k$, or $Na_{x4}R_{y4}(PO_4)_{Z4}M_{l1}$, where, $1 \leq x_1 \leq 3$, $1 \leq y_1 \leq 2$, $1 \leq z_1 \leq 3$, $1 \leq x_2 \leq 7$, $1 \leq y_2 \leq 3$, $1 \leq z_2 \leq 4$, $1 \leq x_3 \leq 7$, $1 \leq y_3 \leq 4$, $1 \leq z_3 \leq 2$, $1 \leq k_3 \leq 4$, $1 \leq x_4 \leq 3$, $1 \leq y_4 \leq 2$, $1 \leq z_4 \leq 2$, and $1 \leq l_1 \leq 3$, R comprises at least one of Mg, Al, Sc, Ti, V, Cr, Mn, Fe, Co, Ni, Cu, Zn, Zr, Nb, Mo, Sn, Hf, Ta, W, or Pb, and M comprises at least one of F, Cl, or Br.

Optionally, the phosphate-based sodium salt material may specifically be $NaFePO_4$, $Na_3V_2(PO_4)_3$, $Na_2FeP_2O_7$, $Na_2MnP_2O_7$, $NaCoP_2O_7$, $Na_7V_3(P_2O_7)_4$, $Na_2FePO_4F$, $Na_3V_2(PO_4)_2F_3$, $Na_4Fe_3(PO_4)_2(P_2O_7)$, $Na_4Mn_3(PO_4)_2(P_2O_7)$, $Na_4Co_3(PO_4)_2(P_2O_7)$, $Na_4Ni_3(PO_4)_2(P_2O_7)$, $Na_7V_4(PO_4)(P_2O_7)_4$, or the like, which is not limited here. In some embodiments, the phosphate-based sodium salt material may be $Na_4Fe_3(PO_4)_2(P_2O_7)$.

The shell layer material 22 for cladding the core layer material 21 comprises a metal oxide, the metal oxide comprising at least one of $WO_3$, $Al_2O_3$, ZnO, CuO, or $TiO_2$. Specifically, actual mass of oxygen atoms in the metal oxide is 70% to 95% of theoretical mass of oxygen atoms in the metal oxide. Optionally, the actual mass of oxygen atoms in the metal oxide is 70%, 75%, 80%, 85%, 90%, 95%, or the like of the theoretical mass of oxygen atoms in the metal oxide, which is not limited here. It should be noted that due to the defect of oxygen vacancies, there is a difference between the actual mass and the theoretical mass of oxygen atoms in the metal oxide, that is, the original metal oxide surface loses some oxygen and forms a disordered structure layer rich in oxygen vacancies, so that a certain amount of oxygen vacancies are formed on the surface of the metal oxide. Excessive oxygen vacancies make metallicity too high, resulting in a decrease in mechanical strength, while reducing the proportion of sodium ions bonded with sodium ions to form a metal sodium salt with high ionic conductivity, and reducing sodium ion conductivity. When there are too few oxygen vacancies, oxygen ions cannot move freely in them, and control of an electric field on the movement of oxygen ions in the electroresistance effect cannot be realized. In some embodiments, the actual mass of oxygen atoms in the metal oxide is 85% of the theoretical mass of oxygen atoms in the metal oxide.

As an optional technical solution of the present application, the positive electrode active material of the metal oxide cladding structure has more excellent reversibility during charging and discharging. The metal oxide has good mechanical strength and high electrical conductivity, so that on the one hand, the conductivity of the positive electrode active material can be improved, and the gram capacity performance and kinetic performance of the positive electrode active material can be enhanced. On the other hand, a direct contact between the positive electrode active material and an electrolyte solution can be prevented, thereby reducing side reactions and improving cycling performance of the positive electrode active material. In the positive electrode active material, the active substance 2 is loaded on the conductive base material 1, and a large number of isolated active substance 2 can be connected through an externally constructed one-dimensional or two-dimensional conductive network to further improve conductivity. In addition, oxygen-containing functional groups of the conductive base material 1 are increased, and the oxygen-containing functional groups and the shell layer material 22 form hydrogen bonds having higher bonding force on the surface of the active substance 2, thereby improving a bonding strength of the active substance 2 and the conductive base material 1.

In the actual application process, a mass percentage of the core layer material 21 in the positive electrode active material is 90% to 99%. Optionally, the mass percentage of the core layer material 21 in the positive electrode active material may specifically be 90%, 91%, 92%, 93%, 96%, 97%, 98%, 99%, or the like, which is not limited here. If the mass percentage of the core layer material 21 in the positive electrode active material is too high and a proportion of the metal oxide cladding the core layer material is too small, conductivity of the positive electrode active material will decrease, affecting the gram capacity performance and kinetic performance of the battery. If the mass percentage of the core layer material 21 in the positive electrode active material is too small, a proportion of the phosphate-based sodium salt material with good cycling performance is too small, resulting in a decrease in cycling performance of the battery. In some embodiments, the mass percentage of the core layer material 21 in the positive electrode active material may be 95%.

A mass percentage of the shell layer material 22 in the positive electrode active material is 1% to 10%. Optionally, the mass percentage of the shell layer material 22 in the positive electrode active material may specifically be 1%, 2%, 3%, 4%, 5%, 6%, 7%, 8%, 9%, 10%, or the like, a thickness of the shell layer material is 50 nm to 400 nm, and optionally, the thickness of the shell layer material may be 50 nm, 100 nm, 150 nm, 200 nm, 300 nm, 350 nm, 400 nm, 450 nm, 500 nm, or the like, which is not limited here. If the mass percentage and thickness of the shell layer material 22 in the positive electrode active material are too high, the shell layer will be too thick, a proportion of mass of metal oxide will be too high, and a proportion of mass of the phosphate-based sodium salt material with good cycling performance in the core layer material becomes smaller, which ultimately affects cycling performance of the battery. If the mass percentage and thickness of the shell layer material 22 in the positive electrode active material are too low, the metal oxide cladding layer cladded on the core layer material is too thin, which results in a decrease of conductivity of the positive electrode active material; and moreover, the surface of the positive electrode active material is prone to a direct contact with the electrolyte solution, resulting in side reactions. In some embodiments, the mass percentage of the shell layer material 22 in the positive electrode active material may be 4% to 8%, and the thickness of the shell layer material may be 100 nm to 300 nm.

As an optional technical solution of the present application, a median particle size of the positive electrode active material satisfies 5 µm≤Dv50≤20 µm, and optionally, the median particle size Dv50 of the positive electrode active material may be 5 µm, 7 µm, 9 µm, 11 µm, 13 µm, 15 µm, 17 µm, 19 µm, 20 µm, or the like, which is not limited here. If the median particle size of the positive electrode active material is too small, the positive electrode active material is prone to particle agglomeration, and prone to producing side reactions with the electrolyte solution. If the median particle size of the positive electrode active material is too large, a diffusion rate of active ions in the positive electrode active material will be reduced, resulting in degradation of kinetic performance and affecting gram capacity performance of the positive electrode active material and cycling performance of the battery. Optionally, the median particle size Dv50 of the positive electrode active material satisfies 8 µm≤Dv50≤15 µm.

In a second aspect, the present application provides an electrochemical apparatus, comprising a positive electrode sheet, a negative electrode sheet, a separator, and an electrolyte solution, the positive electrode sheet comprising the positive electrode active material as described above.

The positive electrode sheet comprises a positive electrode current collector and a positive electrode active material layer applied on the positive electrode current collector, and the positive electrode active material layer comprises the positive electrode active material in the first aspect.

The negative electrode sheet comprises a negative electrode current collector and a negative electrode active material layer on the negative electrode current collector. The negative electrode active material layer comprises a negative electrode active material.

As an optional technical solution of the present application, the negative electrode active material comprises at least one of graphite, a silicon material, a silicon-oxygen material, a tin material, a tin-oxygen material or a silicon-carbon composite material.

As an optional technical solution of the present application, the negative electrode active material layer contains a binder, and the binder comprises, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene 1,1-difluoride, polyethylene, polypropylene, styrene butadiene rubber, acrylic styrene butadiene rubber, epoxy resin, nylon, or the like.

As an optional technical solution of the present application, the negative electrode active material layer further contains a conductive material, and the conductive material comprises, but is not limited to: natural graphite, artificial graphite, carbon black, acetylene black, Ketjen black, carbon fiber, metal powder, metal fiber, copper, nickel, aluminum, silver, polyphenylene derivatives, or the like.

As an optional technical solution of the present application, the negative current collector comprises, but is not limited to: copper foil, nickel foil, stainless steel foil, titanium foil, foamed nickel, foamed copper or a composite current collector.

Since sodium ions do not form an alloy with aluminum, an aluminum-based current collector, comprising any one of aluminum foil, aluminum alloy foil and aluminum-based composite current collector, can be used to reduce cost and weight. The aluminum-based composite current collector comprises a polymeric base film and aluminum foil and/or aluminum alloy foil formed on both sides of the polymeric base film. Specifically, the aluminum-based composite current collector has a "sandwich" structure, where the polymer base film is located in the middle, and the aluminum foil or aluminum alloy foil is provided on both sides of the current collector, or one side of the polymer base film is provided with the aluminum foil while the other side is provided with the aluminum alloy foil. The polymeric base material may be any one of polyamide, polyterephthalate, polyimide, polyethylene, polypropylene, polystyrene, polyvinyl chloride, acrylonitrile-butadiene-styrene copolymer, polybutylene terephthalate, poly(p-phenylene terephthalamide), poly (p-phenylene ether), polyoxymethylene, epoxy resin, phenolic resin, polytetrafluoroethylene, polyvinylidene fluoride, silicone rubber, and polycarbonate. In some embodiments, the aluminum-based composite current collector selected in the present application has better ductility, which facilitates the maintenance of electrode integrity during sodium deposition/deintercalation.

As an optional technical solution of the present application, the separator may be made of various materials suitable for separators of electrochemical energy-storage apparatuses in the field. For example, it may comprise but is not limited to at least one of polyethylene, polypropylene, polyvinylidene fluoride, aramid, polyethylene terephthalate, polytetrafluoroethylene, polyacrylonitrile, polyimide, polyamide, polyester, or natural fibers.

As an optional technical solution of the present application, the electrochemical apparatus further comprises an electrolyte solution, and the electrolyte solution contains an organic solvent, a sodium salt and an additive.

The organic solvent of the electrolyte solution according to the present application may be any organic solvent known in the related art that can be used as a solvent of the electrolyte solution. An electrolyte used in the electrolyte solution according to the present application is not limited, and may be any electrolyte known in the related art. The additive of the electrolyte solution according to the present application may be any additive known in the related art that can be used as an additive of the electrolyte solution.

In specific embodiments, the organic solvent comprises, but is not limited to, at least one of ethylene carbonate (EC), propylene carbonate (PC), diethyl carbonate (DEC), ethyl methyl carbonate (EMC), dimethyl carbonate (DMC), vinylene carbonate, fluoroethylene carbonate, propylene carbonate, propyl propionate, or ethyl propionate.

In specific embodiments, the sodium salt comprises at least one of an organic sodium salt or an inorganic sodium salt.

In specific embodiments, the sodium salt comprises, but is not limited to: sodium hexafluorophosphate ($NaPF_6$), sodium tetrafluoroborate ($NaBF_4$), sodium difluorophosphate ($NaPO_2F_2$), sodium bistrifluoromethanesulfonimide $NaN(CF_3SO_2)_2$(NaTFSI), sodium bis(fluorosulfonyl)imide $Na(N(SO_2F)_2)$(NaFSI), sodium bis(oxalate) borate $NaB(C_2O_4)_2$ (NaBOB), sodium difluoro(oxalato)borate $NaBF_2(C_2O_4)$(NaDFOB), or sodium perchlorate.

As an optional technical solution of the present application, the electrochemical apparatus of the present application comprises but is not limited to all types of primary batteries and secondary batteries. The battery comprises at least one of a soft pack battery, a square aluminum case battery, a square steel case battery, a cylindrical aluminum case battery, or a cylindrical steel case battery.

In a third aspect, the present application provides an electronic device, comprising the electrochemical apparatus described above. The electrochemical apparatus can be used to provide power to the electronic device.

As an optional technical solution of the present application, the electronic device comprises, but is not limited to: laptops, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power sources, motors, automobiles, motorcycles, assisted bicycles, bicycles, lighting apparatuses, toys, game machines, clocks, electric tools, flashlights, cameras, large household storage batteries, energy-storage or sodium-ion capacitors, or the like.

In a fourth aspect, the present application further provides a method for preparing a positive electrode active material, the method comprising the following steps.

S10. A carbon material is put into a solution of concentrated sulfuric acid and concentrated nitric acid in a ratio of 3:1 and stirred for 4 h, washed with deionized water, filtered and put into an oven and dried at 80° C.; where, a filter sieve of a size of 400 meshes is selected.

S20. The above treated carbon material is put into water for ultrasonic dispersion, then mixed with an iron nitrate and sodium dihydrogen phosphate solution in a stoichiometric ratio, and stirred uniformly, followed by producing precursor powder through spray drying technology.

The median particle size of the carbon material after ultrasonic dispersion ranges from 50 nm to 20 μm, an inlet temperature of spray drying is 150° C. to 250° C., and an outlet temperature of spray drying is 80° C. to 150° C.

S30. The precursor powder is calcined at 600° C. for 6 hours and then put into a metal oxide solution with sufficient stirring, the gel precursor is coated on a surface of a phosphate-based sodium salt material by adjusting the PH value, and then calcined at 400° C. to 800° C. under a hydrogen atmosphere, and the obtained product is sieved to obtain a positive electrode active material.

The stirring time is 2 h to 8 h, the adjusted PH value is 10 to 12, the calcination time is 4 h to 10 h, and the median particle size of the sieved positive electrode active material satisfies 8 μm≤Dv50≤15 μm.

Through the above preparation method and the adjustment of mass fraction of the shell layer material, mass fraction of the conductive base material, type of the shell layer material and particle size of the positive electrode active material, the positive electrode active material is finally obtained.

To enable a person skilled in the art to better understand the technical solution of the present application, the present application is described in detail below in conjunction with specific embodiments.

Example 1

(1) Preparation of Negative Electrode Sheet:

A carbon material was firstly put into a mixed solution of concentrated sulfuric acid and concentrated nitric acid with a volume ratio of 3:1 and stirred for 4 h, washed with deionized water, filtered and put into an oven, and then dried at 80° C. The carbon material and a high-molecular polymer were added to N-methylpyrrolidone and stirred into a uniform slurry, the slurry was then coated on copper foil and dried to obtain a carbon material coating for use. Sodium metal was heated to 200° C. in a stainless steel crucible under Ar atmosphere and melted completely, and then alloy component powder was added to a liquid sodium metal and stirred thoroughly for 2 h to ensure that the metal powder and the sodium metal liquid were uniformly mixed, followed by cooling, to obtain a sodium metal alloy active substance. The sodium metal alloy active substance was compounded on a surface of the carbon material coating by cold pressing to obtain a sodium metal negative electrode sheet.

(2) Preparation of Positive Electrode Sheet:

A binder of 10 wt % polyvinylidene fluoride was fully dissolved in N-methylpyrrolidone, and a conductive agent of 10 wt % carbon black and a 80 wt % positive electrode active material were added to obtain a uniformly dispersed slurry. The slurry was evenly coated on a zirconium surface and then transferred to a vacuum drying oven to dry completely. The obtained electrode sheet was subjected to rolling and blanking to obtain a target wafer.

(3) Preparation of Separator

A polypropylene polymer film was used.

(4) Preparation of Electrolyte Solution:

Ethylene glycol dimethyl ether (DME) was used as an organic solvent, followed by dissolving the fully dried sodium salt $NaPF_6$ in a mixed organic solvent to prepare an electrolyte solution with a concentration of 1 mol/L.

(5) Preparation of Button Battery

The above-mentioned positive electrode sheet, separator and negative electrode sheet were stacked in sequence, the separator was located between the positive electrode sheet and the negative electrode sheet to play a role in separating, and then the above-mentioned electrolyte solution was added so that a button battery was assembled.

Examples 1 to 22 and the Comparative Examples 1 to 7 were prepared by the foregoing methods, and specific parameters are shown in Table 1.

TABLE 1

| Serial Number | Type of core layer material | Mass fraction (%) of shell layer material | Mass fraction (%) of conductive base material | Type of shell layer material | Median particle size Dv50(μm) of positive electrode active material |
|---|---|---|---|---|---|
| Example 1 | NaFePO$_4$ | 5% | 5% | TiO$_2$ | 10 |
| Example 2 | Na$_2$MnP$_2$O$_7$ | 5% | 5% | TiO$_2$ | 10 |
| Example 3 | Na$_3$V$_2$(PO$_4$)$_2$F$_3$ | 5% | 5% | TiO$_2$ | 10 |
| Example 4 | Na$_4$Fe$_3$(PO$_4$)$_2$(P$_2$O$_7$) | 5% | 5% | TiO$_2$ | 10 |
| Example 5 | Na$_4$Fe$_3$(PO$_4$)$_2$(P$_2$O$_7$) | 1% | 5% | TiO$_2$ | 10 |
| Example 6 | Na$_4$Fe$_3$(PO$_4$)$_2$(P$_2$O$_7$) | 4% | 5% | TiO$_2$ | 10 |
| Example 7 | Na$_4$Fe$_3$(PO$_4$)$_2$(P$_2$O$_7$) | 6% | 5% | TiO$_2$ | 10 |
| Example 8 | Na$_4$Fe$_3$(PO$_4$)$_2$(P$_2$O$_7$) | 8% | 5% | TiO$_2$ | 10 |
| Example 9 | Na$_4$Fe$_3$(PO$_4$)$_2$(P$_2$O$_7$) | 10% | 5% | TiO$_2$ | 10 |
| Example 10 | Na$_4$Fe$_3$(PO$_4$)$_2$(P$_2$O$_7$) | 5% | 1% | TiO$_2$ | 10 |
| Example 11 | Na$_4$Fe$_3$(PO$_4$)$_2$(P$_2$O$_7$) | 5% | 4% | TiO$_2$ | 10 |
| Example 12 | Na$_4$Fe$_3$(PO$_4$)$_2$(P$_2$O$_7$) | 5% | 6% | TiO$_2$ | 10 |
| Example 13 | Na$_4$Fe$_3$(PO$_4$)$_2$(P$_2$O$_7$) | 5% | 8% | TiO$_2$ | 10 |
| Example 14 | Na$_4$Fe$_3$(PO$_4$)$_2$(P$_2$O$_7$) | 5% | 10% | TiO$_2$ | 10 |
| Example 15 | Na$_4$Fe$_3$(PO$_4$)$_2$(P$_2$O$_7$) | 5% | 5% | WO$_3$ | 10 |
| Example 16 | Na$_4$Fe$_3$(PO$_4$)$_2$(P$_2$O$_7$) | 5% | 5% | Al$_2$O$_3$ | 10 |
| Example 17 | Na$_4$Fe$_3$(PO$_4$)$_2$(P$_2$O$_7$) | 5% | 5% | ZnO | 10 |
| Example 18 | Na$_4$Fe$_3$(PO$_4$)$_2$(P$_2$O$_7$) | 5% | 5% | TiO$_2$ | 5 |
| Example 19 | Na$_4$Fe$_3$(PO$_4$)$_2$(P$_2$O$_7$) | 5% | 5% | TiO$_2$ | 8 |
| Example 20 | Na$_4$Fe$_3$(PO$_4$)$_2$(P$_2$O$_7$) | 5% | 5% | TiO$_2$ | 12 |
| Example 21 | Na$_4$Fe$_3$(PO$_4$)$_2$(P$_2$O$_7$) | 5% | 5% | TiO$_2$ | 15 |
| Example 22 | Na$_4$Fe$_3$(PO$_4$)$_2$(P$_2$O$_7$) | 5% | 5% | TiO$_2$ | 20 |
| Comparative Example 1 | Na$_4$Fe$_3$(PO$_4$)$_2$(P$_2$O$_7$) | 0.1% | 5% | TiO$_2$ | 10 |
| Comparative Example 2 | Na$_4$Fe$_3$(PO$_4$)$_2$(P$_2$O$_7$) | 11% | 5% | TiO$_2$ | 10 |
| Comparative Example 3 | Na$_4$Fe$_3$(PO$_4$)$_2$(P$_2$O$_7$) | 5% | 0.1% | TiO$_2$ | 10 |
| Comparative Example 4 | Na$_4$Fe$_3$(PO$_4$)$_2$(P$_2$O$_7$) | 5% | 11% | TiO$_2$ | 10 |
| Comparative Example 5 | Na$_4$Fe$_3$(PO$_4$)$_2$(P$_2$O$_7$) | 5% | 5% | TiO$_2$ | 1 |
| Comparative Example 6 | Na$_4$Fe$_3$(PO$_4$)$_2$(P$_2$O$_7$) | 5% | 5% | TiO$_2$ | 25 |
| Comparative Example 7 | Na$_4$Fe$_3$(PO$_4$)$_2$(P$_2$O$_7$) | / | 5% | / | 10 |

Performance Test:
(1) Resistivity of positive electrode active material: a powder resistance tester was used to test positive electrode active material powder at a pressure of 20 MPa.
(2) Gram capacity of positive electrode active material
At 25° C., batteries prepared in Examples and Comparative Examples were charged to 4V at a rate of 0.1 C and discharged to 1V at a rate of 0.1 C, and were subjected to a full charge and discharge test to obtain discharge capacity as the material gram capacity.
(3) cycling performance of battery: at 25° C., batteries prepared in Examples and Comparative Examples were charged to 4V at a rate of 0.1 C and discharged to 1V at a rate of 0.1 C, and were subjected to a full-charge full-discharge cycle test until the capacity of every sodium-ion battery was less than 80% of an initial capacity, and then the number of cycles was recorded. Test results are shown in Table 2.

TABLE 2

| Serial Number | Resistivity (Ω · m) of positive electrode active material | Gram capacity (mAh/g) | Number of cycles |
|---|---|---|---|
| Example 1 | 85 | 148 | 791 |
| Example 2 | 104 | 84 | 725 |
| Example 3 | 76 | 121 | 763 |
| Example 4 | 60 | 123 | 987 |
| Example 5 | 88 | 118 | 851 |
| Example 6 | 69 | 121 | 921 |
| Example 7 | 61 | 122 | 937 |
| Example 8 | 61 | 120 | 901 |
| Example 9 | 61 | 118 | 882 |
| Example 10 | 92 | 115 | 829 |
| Example 11 | 69 | 121 | 931 |
| Example 12 | 55 | 122 | 976 |
| Example 13 | 50 | 120 | 963 |
| Example 14 | 48 | 118 | 942 |
| Example 15 | 70 | 120 | 887 |
| Example 16 | 63 | 121 | 927 |
| Example 17 | 66 | 119 | 864 |
| Example 18 | 60 | 124 | 891 |
| Example 19 | 62 | 123 | 932 |
| Example 20 | 68 | 121 | 955 |
| Example 21 | 70 | 121 | 966 |
| Example 22 | 74 | 120 | 949 |
| Comparative Example 1 | 102 | 113 | 762 |
| Comparative Example 2 | 61 | 116 | 838 |
| Comparative Example 3 | 125 | 110 | 618 |
| Comparative Example 4 | 47 | 117 | 901 |

TABLE 2-continued

| Serial Number | Resistivity (Ω · m) of positive electrode active material | Gram capacity (mAh/g) | Number of cycles |
|---|---|---|---|
| Comparative Example 5 | 56 | 124 | 877 |
| Comparative Example 6 | 79 | 118 | 914 |
| Comparative Example 7 | 110 | 110 | 687 |

From Examples 1 to 4, it can be seen that the gram capacity performance and the number of cycles of the batteries prepared from positive electrode active materials with different compositions are slightly different. In some embodiments, the positive electrode active material is $Na_4Fe_3(PO_4)_2(P_2O_7)$.

As can be seen from Examples 5 to 9 and Comparative Examples 1 to 2, the gram capacity performance, kinetic performance and cycling performance of the battery are good when the mass percentage of the shell layer material in the positive electrode active material is in the range of 1% to 10%. If the mass percentage of the shell layer material in the positive electrode active material is too high, the thickness of the core layer is too large, a proportion of mass of the metal oxide is too high, and a proportion of mass of the phosphate-based sodium salt material with good cycling performance in the core layer material becomes smaller, which ultimately affects cycling performance of the battery. If the mass percentage of the shell layer material in the positive electrode active material is too low, the metal oxide cladding layer cladded on the core layer material is too thin, which results in a decrease of conductivity of the positive electrode active material; and moreover, the surface of the positive electrode active material is prone to a direct contact with the electrolyte solution, resulting in side reactions. In some embodiments, the mass percentage of the shell layer material in the positive electrode active material is 4% to 8%.

It can be seen from Examples 10 to 14 and Comparative Examples 3 to 4 that when the mass percentage of the conductive base material in the positive electrode active material is in the range of 1% to 10%, conductivity of the material is improved, and gram capacity of the material is enhanced. If the mass percentage of conductive base material in the positive electrode active material is too high, it will result in excessive carbon material with high specific surface area, no capacity, and low compacted density and reduce battery capacity, thereby resulting in a decrease of the battery energy density and shortening of cycling life. If the mass percentage of the conductive base material in the positive electrode active material is too low, it will result in a difficulty in forming an effective conductive network in the active substance, resulting in a decrease of conductivity rate of the battery and poor gram capacity performance of the active substance, thereby shortening life of the battery. In some embodiments, the mass percentage of the conductive base material in the positive electrode active material is 4% to 8%.

From Example 15 to Example 17, it can be seen that the selection of metal oxide types has an impact on gram capacity performance and cycle life of the battery. In some embodiments, the shell layer material may be $TiO_2$.

It can be seen from Examples 18 to 22 and Comparative Examples 5 to 6 that when the median particle size of the positive electrode active material ranges from 5 μm to 20 μm, the battery has the best gram capacity performance and cycling performance. If the median particle size of the positive electrode active material is too small, the positive electrode active material is prone to particle agglomeration, and prone to producing side reactions with the electrolyte solution. If the median particle size of the positive electrode active material is too large, a diffusion rate of active ions in the positive electrode active material will be reduced, resulting in degradation of kinetic performance and affecting gram capacity performance and cycling performance of the battery. Optionally, the median particle size of the positive electrode active material satisfies 8 μm≤Dv50≤15 μm.

From the known data of Examples 1 to 22 and Comparative Example 7, it can be seen that in Examples 1 to 22, with the change of the mass fraction of the conductive base material, the type of the shell material, and the particle size of the positive electrode active material, there will be a slight impact on the gram capacity performance of the positive electrode active material as well as cycle life of the battery. However, compared with Comparative Example 7, the surface of the core layer material is not cladded with the shell layer material, which leads to a decrease of conductivity of the positive electrode active material and an increase of resistivity of the battery, making a significant drop in gram capacity. Moreover, the direct contact between the core layer material and the electrolyte solution causes side reactions, decreasing cycling performance of the battery.

It should be understood by those skilled in the art that the above embodiments are exemplary and not limiting. Different technical features appearing in different embodiments can be combined to achieve beneficial effects. Those skilled in the art should be able to understand and implement other variations of the disclosed embodiments based on the study of the drawings, specification and claims. In the claims, the term "comprising" does not exclude other devices or steps; the articles are intended to comprise one or more articles when not modified with quantity words, and may be used interchangeably with "one or more articles"; and the terms "first" and "second" are used to indicate names rather than any particular order. Any reference numerals in the claims should not be construed as limiting the scope of protection. The functionality of multiple parts appearing in the claims may be implemented by a single hardware or software module. The fact that certain technical features appear in different dependent claims does not mean that these technical features cannot be combined for beneficial effects.

What is claimed is:

1. A positive electrode active material, comprising:
 a conductive base material, and an active substance distributed at the conductive base material, the active substance having a core-shell structure, and the core-shell structure including a core layer material and a shell layer material;
 wherein:
 the conductive base material comprises a carbon material, the core layer material comprises a phosphate-based sodium salt material, and the shell layer material comprises a metal oxide;
 a mass percentage of the shell layer material in the positive electrode active material is 1% to 10%;
 a mass percentage of the conductive base material in the positive electrode active material is 1% to 10%; and
 a median particle size of the positive electrode active material is 5 μm to 20 μm.

2. The positive electrode active material according to claim 1, wherein the metal oxide comprises at least one of $WO_3$, $Al_2O_3$, $ZnO$, $CuO$, or $TiO_2$.

3. The positive electrode active material according to claim 1, wherein the positive electrode active material has at least one of following features:
   a chemical formula of the phosphate-based sodium salt material is $Na_{x1}R_{y1}(PO_4)_{Z1}$, where $1 \leq x_1 \leq 3$, $1 \leq y_1 \leq 2$, and $1 \leq z_1 \leq 3$, and R comprises least one of Mg, Al, Sc, Ti, V, Cr, Mn, Fe, Co, Ni, Cu, Zn, Zr, Nb, Mo, Sn, Hf, Ta, W, or Pb;
   the chemical formula of the phosphate-based sodium salt material is $Na_{x2}R_{y2}(P_2O_7)_{Z2}$, where $1 \leq x_2 \leq 7$, $1 \leq y_2 \leq 3$, and $1 \leq z_2 \leq 4$, and R comprises at least one of Mg, Al, Sc, Ti, V, Cr, Mn, Fe, Co, Ni, Cu, Zn, Zr, Nb, Mo, Sn, Hf, Ta, W, or Pb;
   the chemical formula of the phosphate-based sodium salt material is $Na_{x3}R_{y3}(PO_4)_{Z3}(P_2O_7)_{k3}$, where $1 \leq x_3 \leq 7$, $1 \leq y_3 \leq 4$, $1 \leq z_3 \leq 2$, and $1 \leq k_3 \leq 4$, and R comprises at least one of Mg, Al, Sc, Ti, V, Cr, Mn, Fe, Co, Ni, Cu, Zn, Zr, Nb, Mo, Sn, Hf, Ta, W, or Pb; and
   the chemical formula of the phosphate-based sodium salt material is $Na_{x4}R_{y4}(PO_4)_{Z4}M_{l1}$, where $1 \leq x_4 \leq 3$, $1 \leq y_4 \leq 2$, $1 \leq z_4 \leq 2$, and $1 \leq l1 \leq 3$, R comprises at least one of Mg, Al, Sc, Ti, V, Cr, Mn, Fe, Co, Ni, Cu, Zn, Zr, Nb, Mo, Sn, Hf, Ta, W, or Pb, and M comprises at least one of F, Cl, or Br.

4. The positive electrode active material according to claim 1, wherein the phosphate-based sodium salt material comprises at least one of $NaFePO_4$, $Na_3V_2(PO_4)_3$, $Na_2FeP_2O_7$, $Na_2MnP_2O_7$, $NaCoP_2O_7$, $Na_7V_3(P_2O_7)_4$, $Na_2FePO_4F$, $Na_3V_2(PO_4)_2F_3$, $Na_4Fe_3(PO_4)_2(P_2O_7)$, $Na_4Mn_3(PO_4)_2(P_2O_7)$, $Na_4Co_3(PO_4)_2(P_2O_7)$, $Na_4Ni_3(PO_4)_2(P_2O_7)$, or $Na_7V_4(PO_4)(P_2O_7)_4$.

5. The positive electrode active material according to claim 1, wherein an actual mass of oxygen atoms in the metal oxide is 70% to 95% of a theoretical mass of oxygen atoms in the metal oxide.

6. The positive electrode active material according to claim 1, wherein the positive electrode active material has at least one of following features:
   a thickness of the shell layer material is 50 nm to 400 nm; and
   a mass percentage of the core layer material in the positive electrode active material is 90% to 99%.

7. The positive electrode active material according to claim 1, wherein the positive electrode active material has at least one of following features:
   the carbon material comprises at least one of carbon nanotubes, graphene, carbon fiber, natural graphite, or artificial graphite;
   the carbon material comprises an oxygen-containing group comprising at least one selected from a carboxyl group, a hydroxyl group and an ether group;
   the carbon material comprises an oxygen-containing group, and a mass percentage of oxygen atoms in the carbon material is greater than or equal to 0.1%; and
   the conductive base material is a carbon material.

8. The positive electrode active material according to claim 1, wherein the positive electrode active material has at least one of following features:
   a resistivity of the positive electrode active material under a pressure of 20 MPa is 0.005 Ω·cm to 100 Ω·cm; and
   a gram capacity of the positive electrode active material is 100 mAh/g to 180 mAh/g.

9. An electrochemical apparatus, comprising:
   a positive electrode sheet, comprising a positive electrode active material comprising:
      a conductive base material, and
      an active substance distributed at the conductive base material, the active substance having a core-shell structure, and the core-shell structure including a core layer material and a shell layer material;
      wherein:
         the conductive base material comprises a carbon material, the core layer material comprises a phosphate-based sodium salt material, and the shell layer material comprises a metal oxide;
         a mass percentage of the shell layer material in the positive electrode active material is 1% to 10%;
         a mass percentage of the conductive base material in the positive electrode active material is 1% to 10%; and
         a median particle size of the positive electrode active material is 5 μm to 20 μm;
   a negative electrode sheet;
   a separator; and
   an electrolyte solution.

10. An electronic device, comprising:
   an electrochemical apparatus, comprising:
      a positive electrode sheet, comprising a positive electrode active material comprising:
         a conductive base material, and
         an active substance distributed at the conductive base material, the active substance having a core-shell structure, and the core-shell structure including a core layer material and a shell layer material;
         wherein:
            the conductive base material comprises a carbon material, the core layer material comprises a phosphate-based sodium salt material, and the shell layer material comprises a metal oxide;
            a mass percentage of the shell layer material in the positive electrode active material is 1% to 10%;
            a mass percentage of the conductive base material in the positive electrode active material is 1% to 10%; and
            a median particle size of the positive electrode active material is 5 μm to 20 μm;
      a negative electrode sheet;
      a separator; and
      an electrolyte solution.

* * * * *